March 12, 1957  A. W. HARVEY ET AL  2,784,587
TESTING OF STIFFNESS OF ATTENUATED BODIES
Filed March 10, 1954  2 Sheets-Sheet 2

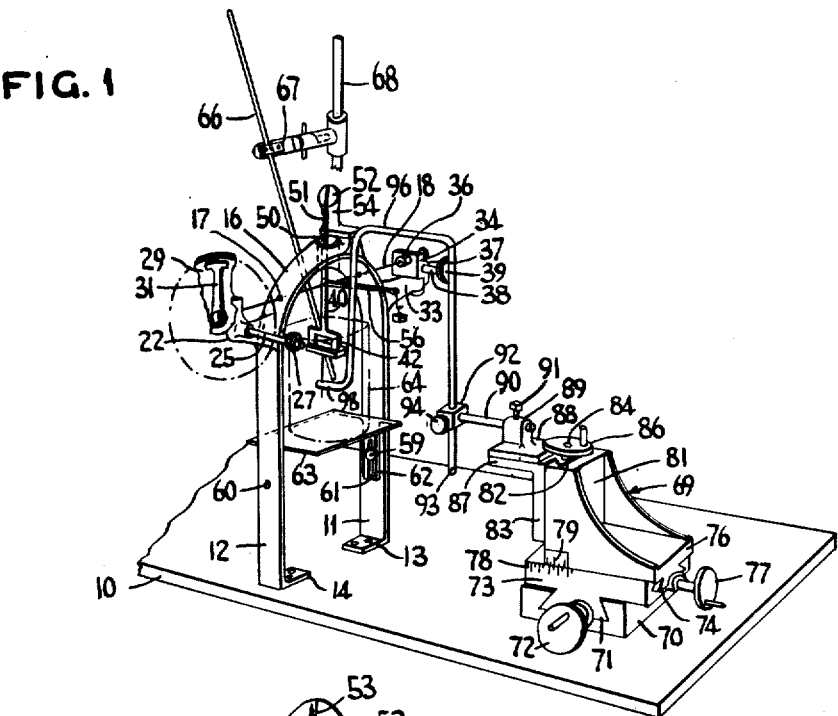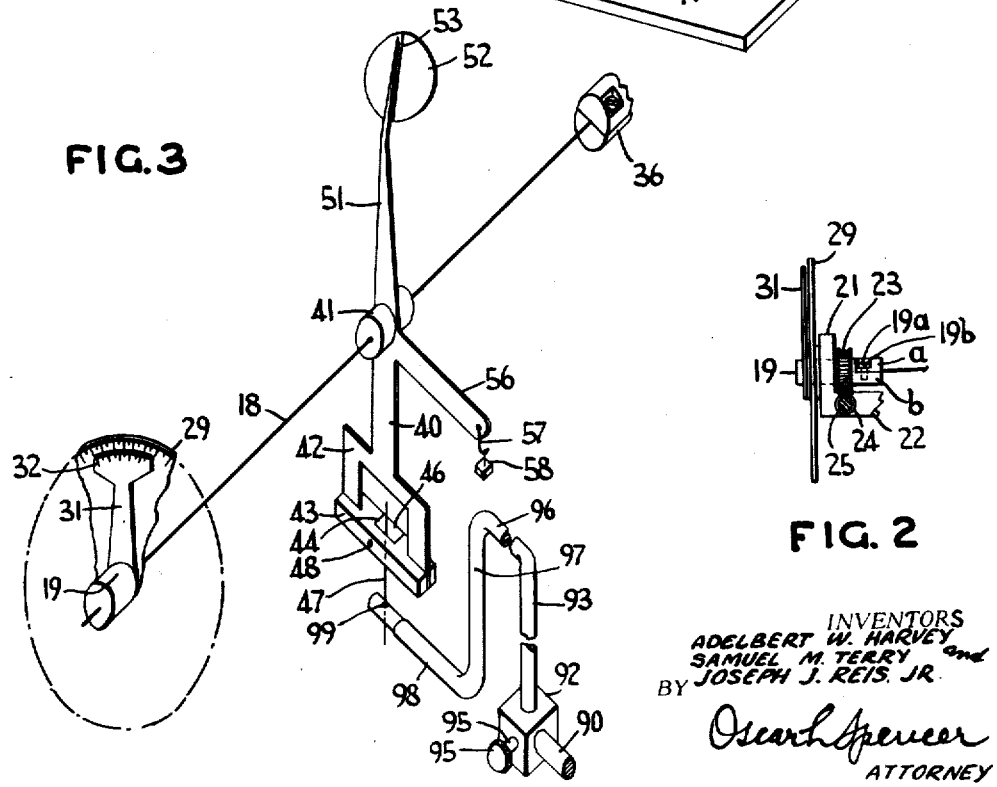

INVENTORS
ADELBERT W. HARVEY
SAMUEL M. TERRY and
BY JOSEPH J. REIS JR.

Oscar L Spencer
ATTORNEY

United States Patent Office 2,784,587
Patented Mar. 12, 1957

2,784,587
TESTING OF STIFFNESS OF ATTENUATED BODIES

Adelbert W. Harvey, Samuel M. Terry, and Joseph J. Reis, Jr., Pittsburgh, Pa., assignors to Pittsburgh Plate Glass Company Application March 10, 1954, Serial No. 415,195

6 Claims. (Cl. 73—100)

This invention relates to an apparatus for making quantitative or relative measurements of the stiffness of flexible bodies and it has particular relation to apparatus for measuring the stiffness of highly flexible attenuated bodies, such as natural fibers, sheets and filaments of plastic materials and the like.

In the manufacture of highly attenuated bodies of plastic materials such as cellulose esters, nylon, vinyl resins, and many other plastic materials, for example, in the manufacture of sheets and filaments, it is often desirable to determine with some degree of exactness the stiffness of the bodies. It may also be desirable to test natural attenuated bodies such as animal hairs and bristles, vegetable fibers or the like. In many instances the sheets or filaments are relatively thin or of small diameter and are quite flexible so that it is difficult or even impossible to make an accurate determination of such stiffness by the use of conventional apparatus used to test less flexible bodies. Most of the apparatus with which such determination have heretofore been made are also relatively slow in operation so that considerable time is required for a determination of the stiffness of a body to be tested. Furthermore, it will be recognized that most of the plastic materials are more or less thermoplastic in nature so that the stiffness thereof tends to vary with the ambient temperature in which the determination is made. With most conventional apparatus it is necessary, or at least customary, to make the determinations in a gaseous medium, such as the atmosphere, so that accurate control of temperature can be attained with difficulty and usually requires the use of an air-conditioned room which may not always be available.

With conventional apparatus it was often impracticable or impossible to make stiffness determinations while the sample is immersed in a liquid. Hence, the apparatus cannot be used to test the effect of a solvent on the material.

The present invention comprises the provision of a relatively simple apparatus by the use of which accurate determinations of the stiffness of highly attenuated flexible bodies can be attained simply and quickly. Moreover, the apparatus can be attained simply and quickly. Moreover, the apparatus is of such nature that the attenuated bodies while being tested can be immersed in a suitable conditioning bath such as a solvent or a nonsolvent liquid medium, the temperature of which can easily be brought to any desired predetermined value and so maintained for the determination of stiffness in any desired number of samples.

Some of the main features of the apparatus of this invention comprises the provision of a torsion wire, a device secured on the wire and being adapted to grip an attenuated body to be tested so that a finger-like portion, which may be termed a "cantilever portion," projects at an angle with respect to the wire. The apparatus further comprises micrometer means for producing a predetermined deflection of the projecting or cantilever portion along with means for acurately measuring the torsion produced in the wire by such deflection.

For a better understanding of the invention, reference may now be had to the accompanying drawings in which:

Fig. 1 is a perspective view of an appropriate embodiment of apparatus suitable for use in the practice of the invention;

Fig. 2 is a fragmentary view showing on a larger scale a portion of the apparatus shown in Fig. 1;

Fig. 3 is a fragmentary perspective view of the main working elements of the apparatus shown in Fig. 1;

Figure 4:
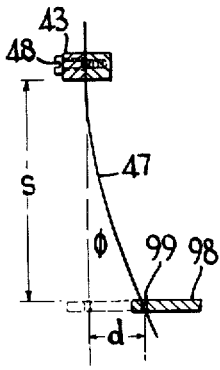
Fig. 4 is a fragmentary sectional view illustrating the position of a portion of an attenuated body while being tested in the apparatus.

In the embodiment of the apparatus herein disclosed, the instrumentalities involved may conveniently be supported upon a suitable base, such as the baseboard 10. The apparatus includes uprights or legs 11 and 12 which are provided with feet 13 and 14 bolted or otherwise secured to the board 10. At their upper ends, the uprights are interconnected by a bow portion 16 having small openings 17 drilled therethrough for a torsion wire 18. This wire, as shown in Fig. 2, is clamped between sections a and b of shaft 19, which sections are drawn together by screws 19a having their heads set in recesses 19b. At its forward end, shaft 19 is journaled in a bearing portion 21 which is laterally and vertically offset from a bracket 22 projecting forwardly from the bow portion 16. Shaft 19 is further provided with a worm gear 23 which engages a suitable worm 24. Shaft 25 of the worm, projecting laterally through a bearing in bracket 22 is provided with a knurled nut or head 27 by means of which the shaft may be rotated in order to rotate the worm gear and thus to rotate the shaft 19.

For purposes of accurately determining rotational movement of the shaft 19, dial 29 having suitable calibrations is fixedly secured on the bearing portion 21 and the forward extremity of the shaft 19 extends axially therethrough. At its outer extremity, the shaft is further provided with an indicator arm 31 rigidly secured thereupon and being provided at its tip with a vernier scale 32 by means of which determinations of relatively small angles of displacement of the shaft 19 can be made with accuracy.

The rear portion of the bow 16 is formed with a rearwardly extending bracket 33 having a bearing block 34 for a rear shaft 36 secured thereupon. This block has a rearwardly extending bracket portion 37 in which is journaled a shaft 38 provided with a worm gear (not shown) engaging a worm (also not shown but similar to the corresponding parts in Fig. 2). Shaft 38 is also provided with a knurled nut or head 39 by means of which the shaft may be rotated in order correspondingly to rotate the shaft 36. It is to be understood that shaft 36 like shaft 19 is sectioned at its forward end to provide suitable gripping means for holding the rear extremity of the torsion wire 18. The function of shaft 38 and the attendant worm and gear will be more fully explained hereinafter.

The torsion wire 18 is provided near its mid-portion with a specimen holder comprising an arm 40 projecting vertically downwardly from a hub 41 threaded upon and clamped to the wire so that as the arm rotates about the wire as a center or axis, the wire is placed under a torque, which is equal to but opposite to that exerted on the arm. The arm at its lower extremity is provided with an inverted U portion 42 having a crossbar 43 closing the opening thereof. This crossbar, as shown in Fig. 3, is provided with a slot 44 in which is disposed a clamping block 46 designed to clamp and thus to hold a sample of an attenuated body, such as a natural or synthetic brush bristle, a section of a hair, or a vegetable fiber indicated at 47. The block 46 is actuated firmly to clamp the sample being tested by means of a suitable set screw 48 extending through crossbar 43 and being threaded at its extremity into the block 46. The lower face of the crossbar 43 constitutes a line of fulcrumage about which the sample tends to flex as a cantilever and this line is substantially spaced from the torsion wire 18. The pendant arm 40 thus provides leverage upon the torsion wire which magnifies the minute forces exerted by flexing of the samples so that more accurate readings can be attained.

Bow 16 is formed with opening 50 and the hub 41 is provided with upwardly extending index arm 51 extending through the opening to traverse the face of a mirror 52 or other appropriate surface which conveniently is provided with a line 53 constituting a zero mark. Means for supporting the mirror may comprise bracket 54 disposed near the mid-portion of the bow 16.

It will also be observed that the arm hub 41 is provided with laterally extending branch 56 provided with a hook 57 for the suspension of weights 58 which, during calibration of the wire 18, may be applied and removed as desired from the hook. In such calibration, the distance between the hook 57 and the wire 18 is known. By application of a series of different weights to the hook, it is easily possible to provide a calibration curve between torque and wire distortions from which corresponding torques in appropriate units for any given distortion of the wire can be determined very readily. Such calibration of a wire will be discussed in greater detail hereinafter.

It will be appreciated that in the determination of the stiffness of attenuated bodies such as bristles, hairs, vegetable fibers or thin sheets of plastic material, it may often be desirable to conduct the determination in a fluid medium. Such medium may be nonsolvent in its nature and being designed essentially for temperature conditioning of the material undergoing test. On the other hand, it is sometimes desirable to determine the effects of media which may have a softening or plasticizing effect on the material being tested. To this end, the legs 11 and 12 may be bored and tapped to receive set screws 59 and 60 received in slots 61 of legs 62 of a shelf 63 to clamp the latter in any position of adjustment. The shelf conveniently may support a glass beaker 64 or other appropriate container for a medium in which the stiffness determinations can be conducted. The lower end of the arm will project into a beaker or other container for liquid. It is to be understood that stiffness determinations can be conducted in air, or other gaseous medium and hence, the beaker may not be required. The height of the beaker may be adjusted properly to submerge the effective portion of the sample by raising or lowering the shelf 63, a movement which is permitted by reason of the slotted legs 62 and the set screws 59 and 60.

In event that the siffness determinations are conducted in a liquid medium, it is usually desirable to maintain an accurate check upon the temperature of such medium. To this end a thermometer 66 extending into the bath and being supported by a suitable clamp 67 on a stand 68 may be provided.

Means accurately to apply a predetermined degree of distortion to a sample engaged by the clamping mechanism as shown in Fig. 1 of the drawing, comprises a three-way micrometer stage mechanism 69, which includes a base portion 70 bolted or otherwise secured on the baseboard 10 and being provided with a dovetail groove for a transverse slide 71. This slide is actuated in the groove by means of a conventional screw mechanism (not shown) which is operated by the hand wheel 72. Slide 71 also includes a block or face portion 73 longitudinally slotted to receive slide portion 74 of L-block 76 movable at right angles to block or slide 71. Conventional screw mechanism operated by hand wheel 77 constitutes means by means of which the block 76 can be operated forwardly and rearwardly in making tests on the apparatus herein illustrated. For purposes accurately determining the degree of movement of the block 76, a side of block 73 is graduated as indicated at 78 and the block 76 in turn, is provided with graduations 79 which preferably constitute a vernier scale for the accurate determination of displacements of the block 73 in making readings, the purposes of which will hereinafter be more fully explained.

L-block 76 is provided with a vertical face or leg 81 having a dovetailed slot for slide portion 82 of vertically movable face plate 83. Movements of the latter element up or down can be controlled with accuracy by means of suitable screw shaft 84 having hand wheel 86.

Plate 83, it will be observed, is provided with a horizontal ledge or shelf 87 upon which is disposed base portion 88 of a lug 89 which is bored slidably to receive forwardly extending rod 90. Means to clamp the rod in any desired position in the bracket or lug includes a set screw 91 threaded through the upper portion of the lug into the opening for the rod.

The forward extremity of the rod 90 is equipped with a block 92 which is vertically bored slidably to receive an upwardly extending shank of hook-like rod 93 designed to apply a bend to a sample under test. The rod may be held in any desired position of vertical adjustment by means of a set screw 94 having knurled head 95. This rod, in order to clear beaker 64, is provided with a horizontally forwardly extending portion 96 having a portion 97 downwardly extending therefrom to impart the hook shape. Portion 97 at its lower extremity, terminates in a second horizontally extending portion 98 which, as indicated at 99 in Fig. 3, is bored loosely to receive the lower extremity of a sample 47 which is to be tested. It will be appreciated that the sample slides freely through the opening 99 so that by movement of the rod 93 backward and forward through the agency of the three-way micrometer stage 69, the lower extremity or finger-like portion of the sample may be flexed to an accurately measured degree without any binding action between the sides of the opening and the sample.

In the operation of the apparatus as shown in the drawings, it is desirable that the torsion wire 18 be correctly adjusted and calibrated. To this end, assuming that the wire is secured by the clamping elements of shafts 19 and 36 with sufficient tension to prevent appreciable sagging under the weight of the arm 40 and its appurtenances, the indicator arm 31 and the dial 29 may be zeroed. The shaft 36 is then rotated by operation of the hand wheel or head 39 and the shaft 38 to bring the indicator arm or needle 51 into register with the line 53 on the plate 52. It is to be understood that this adjustment is made without addition of weight to the arm 56. When this adjustment is made, the apparatus is correctly zeroed and a calibration curve may then be plotted.

This is conveniently accomplished by the addition of weights 58 of appropriate size to the arm 56. Subsequently, the shaft 19 is rotated by means of the shaft 25 in order again to bring the arm 51 into register with the line 53. The distortion or twist exerted upon the arm can be read from the calibrations on the dial 29 and the arm 31 with a high degree of accuracy. This angular distortion of the wire or torsion is measured as the angle theta ($\theta$). The torque in desired units required to produce the distortion can be calculated by the formula $T = mgl$ where $m$ is the mass of weight 58 as expressed by the formula $$m = \frac{\text{weight in grams}}{454 \times 32}$$

$g$ equals the acceleration constant or 32, and $l$ equals the effective length of the arm 56 (in this instance 2.5 inches). Torque T may then be reduced to the expression $T=K\theta$, where $k$ is a constant for the given wire and theta ($\theta$) is the angle of torsion as measured by the dial 29 and the arm 31. By making a number of readings of torque with different weights on the arm 56, the calibration curve of a given wire can be plotted between deflection and torque. The curve within practical limits is a straight line. A typical calibration curve for a 30-gauge steel wire is given in Fig. 5 of the drawings which is expressed in terms of the torque in pound-inches on the horizontal axis, and the corresponding deflections theta ($\theta$) as degrees on the vertical axis. It will be appreciated that different wires will have different calibration curves and therefore the instrument must be recalibrated whenever the wire 18 is replaced. By use of wires of different stiffnesses, it is possible to control the sensitivity of the wire, thus providing for measurement of the stiffness of samples widely varying in degree of flexibility.

After the instrument has thus been calibrated, stiffnesses in flexure can readily be determined either in terms of relative stiffness between known standards, or in absolute quantitative terms.

In order to make a determination of stiffness, a specimen such as a filament, e. g. a brush bristle spun from synthetic plastic, is clamped by the plate 46 with the lower portion thereof extending downwardly as a finger through the opening 99 in the deflector arm. The plate 83 is vertically adjusted to attain desired length of the specimen. The block 73 is adjusted precisely to zero the opening 99 with respect to the filament. Subsequently, the block 73 is operated by operation of the hand wheel 77 to move the arm either forwardly or backwardly in order to produce a definite deflection ($d$) in the specimen under test. The deflection can be read to a high degree of accuracy from the scales 78 and 79. Subsequently, the arm 31 is adjusted again to zero the arm 51 with respect to the mark 53 on plate 52; thus definitely fixing the angle of deflection ($\phi$) the angle of displacement of the specimen under test produced by the actuation of the micrometer stage as shown in Fig. 4 as measured by the angle phi ($\phi$). The torque required to restore arm 51 to its zero position can be measured by observation of the deflection of arm 31 with respect to the original zero position, and the torque in desired units, required to bring the pointer 51 back to its zero position can be determined from the calibration curve already described.

Figure 5:
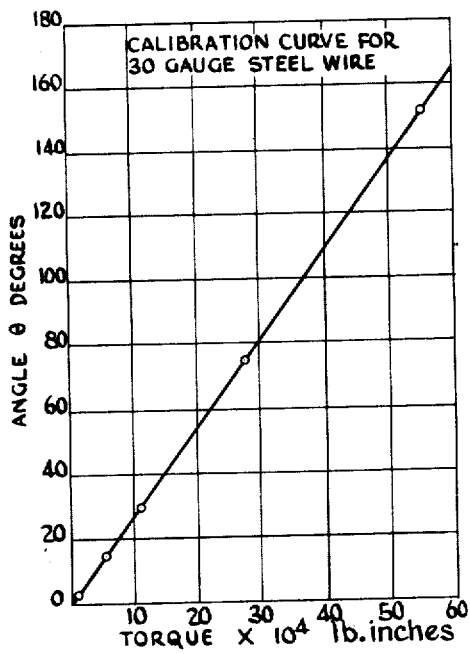
Fig. 5 is an illustrative calibration curve for a specific torsion wire employed as a torque measuring means in the apparatus illustrated.

The stiffness M of the specimen under test can readily be determined by the formula $$M=\frac{TS^2}{3dI}$$

where M equals the stiffness in flexure of the specimen, T equals the torque as determined from the curve of Fig. 5 exerted upon the torsion wire 18, S is the distance between the point of clamping of the specimen by the block 46 and the point of application of the distorting force by the arm 98, $d$ equals the displacement of the lower extremity of the specimen, and I equals the moment of inertia of the section of the sample. The angle $\phi$ preferably is small. The distance S may be varied in accordance with the stiffness of the sample. For highly flexible bodies, it should be relatively short. For stiffer samples, it may be increased.

For a rectangular section, the moment I may be determined from the formula $$I=\frac{ab^3}{12}$$

where $a$ is the breadth and $b$ is the thickness of the specimen. This formula is useful for where the specimen is a strip of foil. For a specimen of cylindrical section, the moment is expressed by the formula $$I=\pi\frac{r^4}{4}$$

where $r$ is the radius of the section. For an elliptical cross section, the moment of inertia is expressed by the formula $$I=\pi\frac{ab^3}{4}$$

where $a$ is the major axis and $b$ is the minor axis. Moments of other sections can readily be determined from the handbooks or by other methods familiar to the engineering art.

While the moment of inertia of some bodies such as tapered bristles is variable along the length of the sample, the apparatus can be still used for testing relative stiffness of a series. Approximate or average stiffness can also be measured. In making such determinations, it is desirable to reduce the distance to a minimum in order to reduce the variation in sections between the point of support and the point of applying force.

It will be appreciated that the determinations of stiffness may be relative in term, that is, stiffness as determined by the torque produced by a given deflection $d$ for a specimen accepted as a standard may be compared with that of a given specimen under test without actual determination of the modulus M.

It will be appreciated that stiffness is variable dependent upon the temperature at which the determination is conducted. The determinations of stiffness can be conducted, if desired, at room temperature and directly in the atmosphere. On the other hand, it is often desirable to conduct the determination in a liquid medium which can be maintained at any desired temperature or in which the temperature can be varied progressively in order to admit of the making of a series of determinations of stiffness at progressively varying temperatures. If the determinations are to be made in a liquid medium, the latter may be contained in the beaker 64. Preferably, the level of the liquid should be sufficiently high to cover the entire effective length of the sample between the clamping device and the arm 98. The vessel preferably is equipped with temperature control means, such as an electrical heating mantle (not shown) whereby the medium may be brought to predetermined temperature or the temperature may be gradually raised or lowered in order to permit of determination of the variation of the stiffness of the material with variations of temperature.

Figure 6:
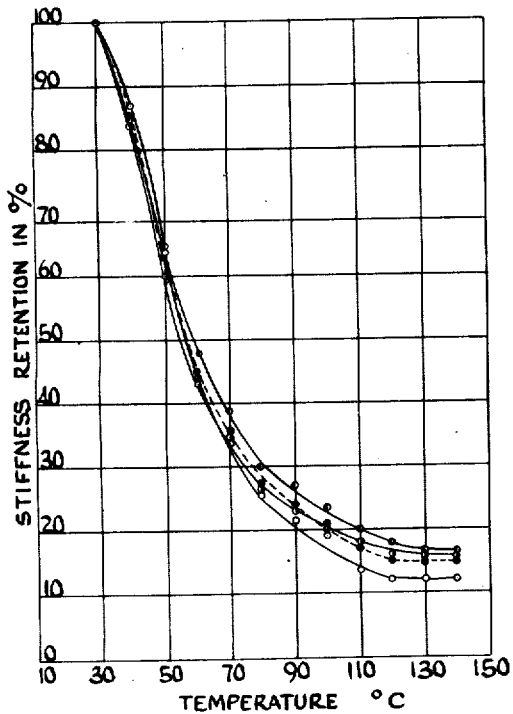
Fig. 6 is a family of illustrative stiffness-temperature curves for one particular plastic, illustrating one type of determination which can be made by use of the apparatus of the present invention.

Fig. 6 illustrates the variation of the stiffness of a series of nylon filaments with variations of temperature. In the figure, the temperatures as ° C. are plotted on the horizontal axis. Corresponding stiffness in terms of percentage, based upon an initial determination at 30° C., are plotted along a vertical axis. The close approximation of the curves to each other for several different samples is indicative of the accuracy of the method in making the determinations.

If the influence of solvents on the stiffness of the filaments or films is to be determined, the following procedure may be followed: The distortion, as the angle of distortion of the torsion wire 18, is determined for a given specimen either in air or in an inert liquid medium. Next, the specimen is immersed in the solvent medium at the same temperature and the change in stiffness in percentages is determined as a function of the time of immersion in the solvent.

It will be appreciated that the apparatus as herein shown and described is relatively simple in construction. The apparatus lends itself exceptionally well to the determination of stiffnesses while the sample is immersed in a liquid medium, thus admitting of operation of the apparatus in a room with a variable temperature and also for determinations of stiffnesses in various solvents. The apparatus is useful in making determinations of stiffnesses of filamentary or sheet materials of such high flexibility that accurate determinations cannot be made by use of conventional testing apparatus employed with relatively stiff specimens.

The forms of the invention as herein shown and described are by way of illustration. It will be apparent to those skilled in the art that numerous modifications may be made therein without departure from the spirit of the invention or the scope of the appended claims.

We claim:

1. Apparatus for measuring the stiffness of an attenuated body comprising a torsion wire, an arm firmly clamped upon the wire, means secured to the arm to grip an attenuated body whereby said body projects as a cantilever and to provide a fulcrum for the body spaced from said wire, means to exert a pressure against the body at a predetermined distance from the first mentioned means whereby to deflect said body and comprising a slide member and micrometer screw means to move the slide member at right angles to the attenuated body and means engaging the body so that movement of the slide member in a direction perpendicular to the body produces deflection thereof, means to measure the deflection, and means to measure the torque produced on the wire by the deflection of the body and comprising a pair of elements, one being an index dial, the other being a pointer operatively associated therewith, one element being coaxially fixed upon the wire and being rotatable to counterbalance said torque and to return the arm to its initial position, the other being fixedly mounted for relative independent movement with respect to the other whereby to measure the angle of torsion of the wire required to counterbalance said torque.

2. Apparatus for measuring the stiffness of an attenuated body comprising a torsion wire, said wire being fixedly secured at one end to a shaft rotatable coaxially with respect to the wire, means to rotate the shaft, a dial coaxially disposed with respect to the shaft and a pointer means associated with the dial, the dial and the pointer means being relatively movable about the center of the dial and one being fixedly mounted while the other is fixed on the shaft, whereby the degree of rotation of the shaft can be measured, said wire further having an arm firmly clamped thereupon and means secured to the arm to grip an attenuated body with an end thereof projecting therefrom as a cantilever and to provide a fulcrum for the body spaced from said wire, means to exert pressure against the projecting end transversely of the body and in a plane perpendicular to the wire and at a predetermined distance from the gripping means whereby to deflect said body, and means to measure the deflection of the attenuated body.

3. Apparatus for measuring stiffness of an attenuated body, comprising a substantially horizontal torsion wire, an arm firmly clamped upon the wire and projecting vertically downwardly therefrom, means on the arm to grip said attenuated body with an end thereof projecting downwardly and to provide a fulcrum for the body, said fulcrum being spaced from said wire, means to exert pressure horizontally against the attenuated body at a predetermined distance below said fulcrum whereby to deflect said body in a plane perpendicular to the wire, means to measure the deflection produced and means to measure the torque produced on the wire by the deflection.

4. Apparatus as defined in claim 3 which further comprises supporting means for a container for a liquid medium disposed to receive said attenuated body while measurements are being conducted thereupon.

5. Apparatus for measuring the stiffness of an attenuated body, comprising a substantially horizontal torsion wire, a vertically downwardly pendant arm firmly clamped upon the wire, means on the lower end of the arm and spaced from the wire to clamp said attenuated body with an end thereof projecting downwardly, means laterally to displace said pendant end and comprising a slide horizontally movable in a plane perpendicular to the wire, an arm on the slide having a vertical opening formed therein and being adapted freely to receive said body, means to move said slide, means to measure the movement and means to measure the torque on the wire produced by deflection of the body through said movement.

6. Apparatus for measuring the stiffness of an attenuated body comprising a torsion wire, said wire being secured at one end to a shaft rotatable coaxially with respect to the wire, means to rotate the shaft, a dial coaxially disposed with respect to the shaft and a pointer means associated with the dial, the dial and the pointer means being relatively movable about the center of the dial and one being fixedly mounted while the other is fixed on the shaft, whereby the degree of rotation of the shaft can be measured, said wire further having an arm firmly clasped thereupon in pendant position, means secured to the arm to grip the attenuated body with one end thereof projecting therefrom as an cantilever and to provide a fulcrum for the body spaced from said center and slide means operable independently with respect to dial and the pointer to flex the attenuated body, and means to rotate the shaft to bring the pendant arm to rest position, whereby readings of the torsion exerted on the arm by flexing of the attenuated body can be made with the arm in rest position.

References Cited in the file of this patent
UNITED STATES PATENTS

| | | |
|---|---|---|
| 2,063,275 | Taber | Dec. 8, 1936 |
| 2,154,631 | McNally | Apr. 18, 1939 |
| 2,417,392 | Craig et al. | Mar. 11, 1947 |
| 2,627,179 | Grant | Feb. 3, 1953 |
| 2,645,932 | MacLaren | July 21, 1953 |

OTHER REFERENCES

Stiffness of Paper, by Carson and Worthington, published in the U. S. Natl. Bur. of Standards Journal of Research, vol. 49 No. 6, December 1952, pp. 385–391. A copy is in the Scientific Library of the U. S. Patent Office.

U. S. DEPARTMENT OF COMMERCE
PATENT OFFICE

CERTIFICATE OF CORRECTION

Patent No. 2,784,587                                                     March 12, 1957

Adelbert W. Harvey et al.

It is hereby certified that error appears in the printed specification of the above numbered patent requiring correction and that the said Letters Patent should read as corrected below.

Column 1, line 19, for "a" read -- as --; lines 55 and 56, strike out "Moreover, the apparatus can be attained simply and quickly."; line 65, for "comprises" read -- comprise --; column 2, line 66, for "torison" read -- torsion --; column 3, line 60, for "siffness" read -- stiffness --.

Signed and sealed this 11th day of March 1958.

(SEAL)
Attest:
KARL H. AXLINE
Attesting Officer

ROBERT C. WATSON
                                                                                         Commissioner of Patents